US011693624B2

(12) United States Patent
Mou et al.

(10) Patent No.: US 11,693,624 B2
(45) Date of Patent: Jul. 4, 2023

(54) AI CAPABILITY RESEARCH AND DEVELOPMENT PLATFORM AND DATA PROCESSING METHOD

(71) Applicant: Beijing Baidu Netcom Science Technology Co., Ltd., Beijing (CN)

(72) Inventors: Xintong Mou, Beijing (CN); Long Wang, Beijing (CN); Hao Li, Beijing (CN); Kuan Shi, Beijing (CN); Bo Peng, Beijing (CN); Haitao Yu, Beijing (CN); Qianqian Sha, Beijing (CN); Wenbin Ren, Beijing (CN); Xianyuan Mo, Beijing (CN); Haobo Wu, Beijing (CN)

(73) Assignee: Beijing Baidu Netcom Science Technology Co., Ltd.

( * ) Notice: Subject to any disclaimer, the term of this patent is extended or adjusted under 35 U.S.C. 154(b) by 365 days.

(21) Appl. No.: 16/911,490

(22) Filed: Jun. 25, 2020

(65) Prior Publication Data

US 2021/0004642 A1 Jan. 7, 2021

(30) Foreign Application Priority Data

Jul. 2, 2019 (CN) ........................ 201910591585.1

(51) Int. Cl.
*G06F 16/903* (2019.01)
*G06F 7/24* (2006.01)
(Continued)

(52) U.S. Cl.
CPC .............. *G06F 7/24* (2013.01); *G06F 16/903* (2019.01); *G06F 17/18* (2013.01); *G06F 18/10* (2023.01);
(Continued)

(58) Field of Classification Search
CPC ..................................................... G06F 16/903
See application file for complete search history.

(56) References Cited

U.S. PATENT DOCUMENTS

2019/0095992 A1 3/2019 Soh
2020/0234177 A1* 7/2020 Matcha ............... G06F 16/2456
2021/0158221 A1* 5/2021 Marlin ................ G06F 21/6227

FOREIGN PATENT DOCUMENTS

CN 102193792 A 9/2011
CN 102970183 A 3/2013
(Continued)

OTHER PUBLICATIONS

First Office Action in CN Patent Application No. 201910591585.1 dated Dec. 2, 2022.

*Primary Examiner* — Baoquoc N To
(74) *Attorney, Agent, or Firm* — Dilworth IP, LLC

(57) ABSTRACT

Embodiments of the present disclosure provide an AI capability research and development platform and a data processing method. The AI capability research and development platform includes: a data management module, a tool management module, a process management module and a model management module, where the data management module is configured to perform data processing on received data, including at least one of the following: analyzing data type of the data, converting the data according to preset data format and storing the data; the tool management module is configured to store at least one tool, each tool being used to execute a preset processing flow; the process management module is configured to perform model training according to the tool provided by the tool management module and the data provided by the data management module; the model management module is configured to store a model obtained by the model training.

20 Claims, 13 Drawing Sheets

(51) Int. Cl.

| | |
|---|---|
| ***G06N 20/00*** | (2019.01) |
| ***G06F 17/18*** | (2006.01) |
| ***G06F 18/40*** | (2023.01) |
| ***G06F 18/10*** | (2023.01) |
| ***G06F 18/211*** | (2023.01) |

(52) U.S. Cl.
CPC ............ *G06F 18/211* (2023.01); *G06F 18/40* (2023.01); *G06N 20/00* (2019.01)

(56) References Cited

FOREIGN PATENT DOCUMENTS

| | | | |
|---|---|---|---|
| CN | 106779087 | A | 5/2017 |
| CN | 108519876 | A | 9/2018 |
| CN | 108537289 | A | 9/2018 |
| CN | 108664540 | A | 10/2018 |
| CN | 109272119 | A | 1/2019 |

* cited by examiner

Tool list > Tool details mxy_refine_cls

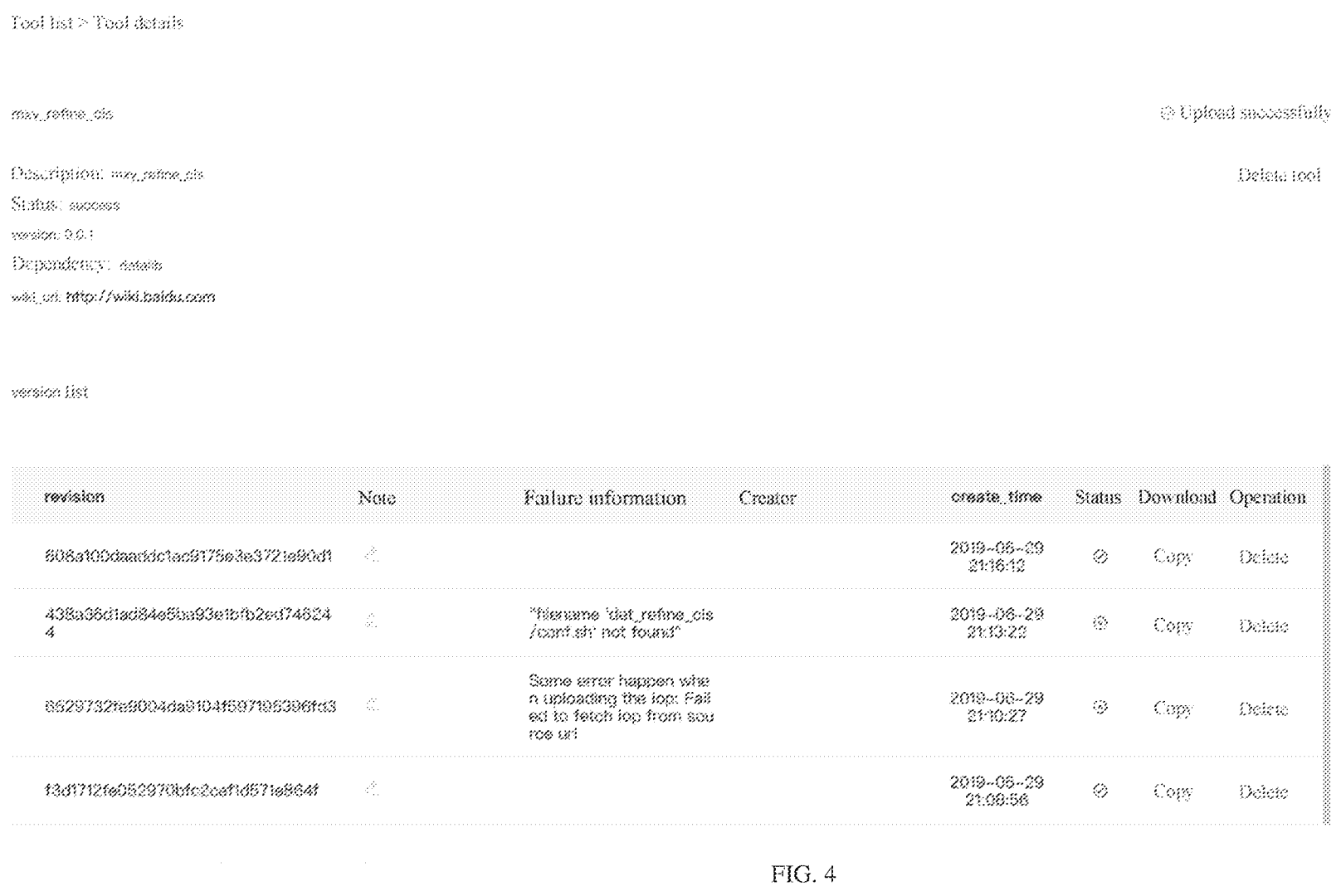

Upload successfully

Description: mxy_refine_cls

Delete tool

Status: success version: 0.0.1

Dependency: details wiki_url: http://wiki.baidu.com version list

| revision | Note | Failure information | Creator | create_time | Status | Download | Operation |
|---|---|---|---|---|---|---|---|
| 808a100daaddc1ac9175e3e3721e90d1 | | | | 2019-06-29 21:16:12 | | Copy | Delete |
| 438a36d1ad84e5ba93e1b1b2ed748244 | | "filename 'dat_refine_cls/conf.sh' not found" | | 2019-06-29 21:13:22 | | Copy | Delete |
| 8529732fe9004da9104f59719639 6fd3 | | Some error happen when uploading the lop: Failed to fetch lop from source url | | 2019-06-29 21:10:27 | | Copy | Delete |
| f3d1712fe052970bfc2caf1d571e864f | | | | 2019-06-29 21:08:56 | | Copy | Delete |

FIG. 4

AI CAPABILITY RESEARCH AND DEVELOPMENT PLATFORM AND DATA PROCESSING METHOD

CROSS-REFERENCE TO RELATED APPLICATION

This application claims priority to Chinese Patent Application No. 201910591585.1, filed on Jul. 2, 2019, which is hereby incorporated by reference in its entirety.

TECHNICAL FIELD

The present disclosure relates to the field of communication technologies and, in particular, relates to an AI capability research and development platform and a data processing method.

BACKGROUND

When realizing the development of a model, six links are usually needed, including: data collection, data annotation, model training, testing, launching, and encapsulation and calling.

In the prior art, these six steps are completed offline in six independent links. For example, data collection needs the business party or the strategy developer to perform targeted collection, and needs to be independently managed by offline individuals; the data annotation needs the strategy developer to present requirements to the public testing, and offline docking needs to be performed for the annotation content; the model training needs to be completed independently by the strategy developer offline, and related resources needs to be managed; the testing needs to be completed by docking testers offline; the launching needs to be completed by docking architecture developers offline; and the encapsulation and calling needs the external business part to perform encapsulation to obtain an externally callable service.

However, in the prior art, when performing the six steps, offline personnel from multiple parties need to communicate and debug with each other, resulting in a very low development efficiency.

SUMMARY

Embodiments of the present disclosure provide an AI capability research and development platform and a data processing method to solve the technical problem of low efficiency in model development in the prior art.

A first aspect of embodiments of the present disclosure provides an AI capability research and development platform, including:

a data management module, configured to perform data processing on received data, where the data processing includes at least one of the following: analyzing a data type of the data, converting the data according to a preset data format, and storing the data;

a tool management module, configured to store at least one tool, each of the at least one tool being used to execute a preset processing flow;

a process management module, configured to perform model training according to the tool provided by the tool management module and the data provided by the data management module; and a model management module, configured to store a model obtained by the model training.

Optionally, the data management module is further configured to:

collect to-be-back-flow data, where the to-be-back-flow data is data that meets a preset back-flow condition; the to-be-back-flow data is used to provide source data for model iteration.

Optionally, collecting to-be-back-flow data includes:

setting the to-be-back-flow data in a back-flow catalog; and collating the back-flow catalog according to a preset frequency; where the collating includes: sorting to-be-back-flow data which is collected during a preset time period, and setting a same kind of to-be-back-flow data in the to-be-back-flow data which is collected during the preset time period into one back-flow catalog.

Optionally, the tool management module is further configured to:

receive, in a tool creation page of the tool management module, a tool creation operation of a user; and generate a tool according to the tool creation operation.

Optionally, the platform further includes:

a test module, configured to test the model obtained by the training; and a platform management module, configured to coordinate and manage the data management module, the tool management module, the process management module, the model management module and the test module at a project granularity.

Optionally, the test module is further configured to: generate a test report.

Optionally, the module management module is further configured to store at least one of a creator, training data set information and model index information of the model.

Optionally, a type of the tool includes at least one of the following: a data cleaning type, a data mining type, a model training type, a service evaluation type, a data back-flow type, and a batch prediction type.

Optionally, the data management module is specifically configured to:

receive to-be-processed data of a project;

analyze a data type of the to-be-processed data;

convert to-be-processed data whose data type meets a preset condition in the to-be-processed data into target data; where the target data has the preset data format;

perform statistic on the target data; and sort the target data into a test set and a data set.

Optionally, the data management module is further configured to:

modify, according to a modification operation of the user, to-be-processed data whose data type does not meet the preset condition in the to-be-processed data into data of the preset data format.

Optionally, performing statistic on the target data includes:

querying data of at least one preset class in the target data; and performing, in each of the at least one preset class, statistic on data of the each of the at least one preset class.

Optionally, the process management module is further configured to:

provide a model training user interface;

receive, in the model training user interface, a target data set and a target tool selected by the user;

receive, in the model training user interface, a connecting line between the target data set and the target tool from the user;

transfer the target data set to the target tool according to the connecting line; and perform model training according to the target tool to obtain a trained model in a case of receiving a running instruction.

Optionally, the process management module is further configured to:

display a model corresponding to a model viewing instruction in a case of receiving the model viewing instruction.

A second aspect of embodiments of the present disclosure provides a data processing method, which is applied to the AI capability research and development platform described in the first aspect of the embodiments of the present disclosure, where the method includes:

performing data processing on received data, where the data processing includes at least one of the following: analyzing a data type of the data, converting the data according to a preset data format, and storing the data;

performing model training according to a tool and the data; and storing a model obtained by the model training.

Optionally, the method also includes:

collecting to-be-back-flow data, where the to-be-back-flow data is data that meets a preset back-flow condition; the to-be-back-flow data is used to provide source data for model iteration.

Optionally, the collecting to-be-back-flow data includes:

setting the to-be-back-flow data in a back-flow catalog; and collating the back-flow catalog according to a preset frequency; where the collating includes: sorting to-be-back-flow data which is collected during a preset time period, and setting a same kind of to-be-back-flow data in the to-be-back-flow data which is collected during the preset time period into one back-flow catalog.

Optionally, the method also includes:

receiving, in a tool creation page, a tool creation operation of a user; and generating a tool according to the tool creation operation.

Optionally, the method also includes:

testing the model obtained by the training.

Optionally, after testing the model obtained by the training, the method further includes:

generating a test report.

Optionally, a type of the tool includes at least one of the following: a data cleaning type, a data mining type, a model training type, a service evaluation type, a data back-flow type, and a batch prediction type.

Optionally, the performing data processing on received data includes:

receiving to-be-processed data of a project;

analyzing a data type of the to-be-processed data;

converting to-be-processed data whose data type meets a preset condition in the to-be-processed data into target data; where the target data has the preset data format;

performing statistic on the target data; and sorting the target data into a test set and a data set.

Optionally, the method also includes:

modifying, according to a modification operation of the user, to-be-processed data whose data type does not meet the preset condition in the to-be-processed data into data of the preset data format.

Optionally, the performing statistic on the target data includes:

querying data of at least one preset class in the target data; and performing, in each of the at least one preset class, statistic on data of the each of the at least one preset class.

Optionally, the method also includes:

providing a model training user interface;

receiving, in the model training user interface, a target data set and a target tool selected by the user;

receiving, in the model training user interface, a connecting line between the target data set and the target tool from the user;

transferring the target data set to the target tool according to the connecting line; and performing model training according to the target tool to obtain a trained model in a case of receiving a running instruction.

Optionally, the method also includes:

displaying a model corresponding to a model viewing instruction in a case of receiving the model viewing instruction.

A third aspect of embodiments of the present disclosure provides an electronic device, including: a processor, a memory, and a computer program; where the computer program is stored in the memory and configured to be executed by the processor, and the computer program includes instructions for executing the method as described in any one of the foregoing second aspect.

A fourth aspect of embodiments of the present disclosure provides a computer-readable storage medium, having a computer program stored thereon, which, when being executed, implements the method as described in any one of the foregoing second aspect.

Advantages of the embodiments of the present disclosure compared with the prior art are as follows:

the embodiments of the present disclosure provide an AI capability research and development platform and a data processing method, where the AI capability research and development platform can support the online process of data collection and model acquisition, and can efficiently perform model development. Specifically, the AI capability research and development platform of the embodiments of the present disclosure includes a data management module, a tool management module, a process management module and a model management module, where the data management module is configured to perform data processing on the received data, where the data processing includes at least one of the following: analyzing the data type of the data, converting the data according to the preset data format and storing the data; the tool management module is configured to store at least one tool, each tool being used to execute a preset processing flow; the process management module is configured to perform model training according to the tool provided by the tool management module and the data provided by the data management module; the model management module is configured to store the model obtained by the model training. During model training in the embodiment of the present disclosure, data collection, model training and the like can be uniformly processed on the platform without communication and debugging by offline personnel from multiple parties, and the development efficiency is relatively high.

BRIEF DESCRIPTION OF THE DRAWINGS

In order to illustrate technical solutions in embodiments of the present invention or in the prior art more clearly, the drawings used in description of the embodiments or the prior art will be briefly described below. Obviously, the drawings in the following description are merely some embodiments of the present invention, and other drawings may be obtained by those skilled in the art according to these drawings without any creative effort.

FIG. 4 is a schematic diagram of an interface of a tool management module according to an embodiment of the present disclosure;

DETAILED DESCRIPTION OF THE EMBODIMENTS

Figure 1:
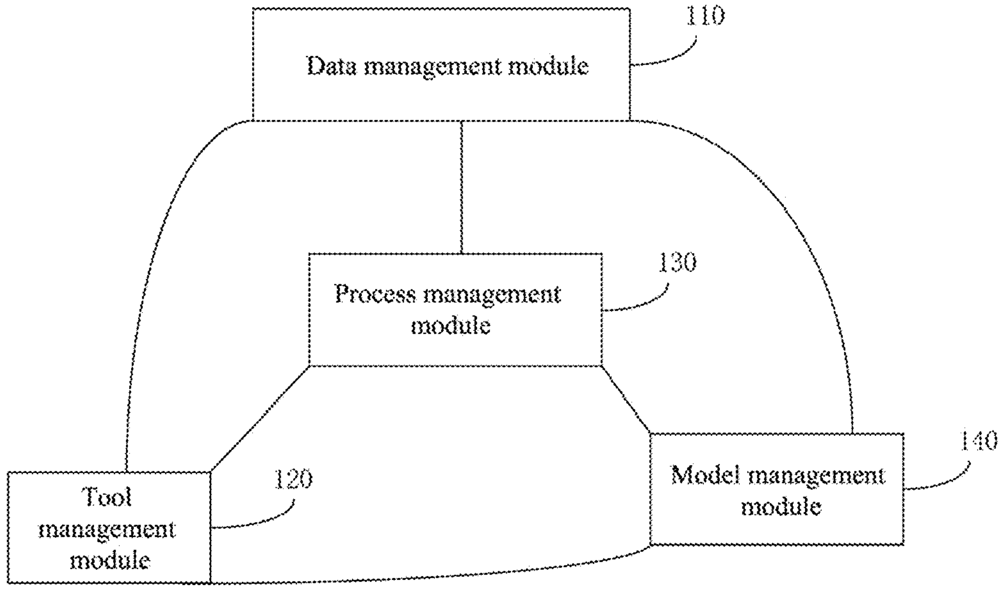
FIG. 1 is a schematic diagram of functional modules of an AI capability research and development platform according to an embodiment of the present disclosure.

The technical solutions in embodiments of the present disclosure will be described in the following with reference to the accompanying drawings of the embodiments of the present disclosure. Obviously, the described embodiments are merely part of embodiments of the disclosure, not all embodiments. Based on the embodiments of the present disclosure, all other embodiments obtained by those skilled in the art without creative effort shall belong to the protection scope of the present disclosure.

Exemplary embodiments will be described in detail here, examples of which are shown in the accompanying drawings. When the following description refers to the accompanying drawings, the same numerals in different drawings represent the same or similar elements unless otherwise indicated. The implementations described in the following exemplary embodiments do not represent all implementations consistent with the present disclosure. On the contrary, they are only examples of apparatus and methods that are consistent with some aspects of the disclosure and detailed in the appended claims.

It should be clear that the described embodiments are merely part of the embodiments of the present disclosure, not all embodiments. Based on the embodiments of the present disclosure, all other embodiments obtained by those skilled in the art without creative effort shall belong to the protection scope of the present disclosure.

The terms used in the embodiments of the present disclosure are for the purpose of describing particular embodiments merely and are not intended to limit the present disclosure. The singular forms "a", "said", and "the" used in the embodiments of the present disclosure and the appended claims are also intended to include the plural forms, unless the context clearly indicates other meanings.

It should be understood that the term "and/or" used herein is merely an association relationship describing associated objects, which means that there may be three kinds of relationships, for example, A and/or B, may indicate three situations: A exists alone, A and B exist at the same time, B exists alone. In addition, the symbol "I" herein generally indicates that the related objects before and after the symbol are in an "or" relationship.

Depending on the context, the words "as if", "if" used here may be interpreted as "at" or "when" or "in response to determining" or "in response to detecting". Similarly, depending on the context, the phrases "if it is determined" or "if it is detected (stated condition or event)" may be interpreted as "when it is determined" or "in response to determining" or "when it is detected (stated condition or event)" or "in response to detecting (stated condition or event)".

It should also be noted that the terms "include", "comprise", or any other variation thereof are intended to cover non-exclusive inclusions, so that a commodity or system that includes a series of elements includes not only those elements, but also other elements that are not explicitly listed, or elements that are inherent to this commodity or system. Without more restrictions, the element limited by the sentence "include one . . . " does not exclude the existence of other identical elements in the commodity or system including this element.

Embodiments of the present disclosure provide an AI capability research and development platform and a method, where the AI capability research and development platform can support an online process from data collection to model acquisition, and can efficiently perform model development. Specifically, the AI capability research and development platform of an embodiment of the present disclosure includes: a data management module, a tool management module, a process management module and a model management module, where the data management module is configured to perform data processing on received data, where the data processing includes at least one of the following: analyzing a data type of the data, converting the data according to a preset data format and storing the data; the tool management module is configured to store at least one tool, each tool being used to execute a preset processing flow; the process management module is configured to perform model training according to the tool provided by the tool management module and the data provided by the data management module; the model management module is configured to store a model obtained by the model training. During model training in the embodiment of the present disclosure, data collection, model training and the like can be uniformly processed on the platform without communication and debugging by offline personnel from multiple parties, and the development efficiency is relatively high.

The AI capability research and development platform described in the embodiment of the present disclosure can be applied to a terminal, and the terminal may include a mobile phone, a tablet computer, a notebook computer, a desktop computer, or a server, and other electronic devices that can run the AI capability research and development platform.

The AI capability research and development platform described in the embodiment of the present disclosure can be an integrated platform for providing service support for various artificial intelligence (AI) services. In an example, the AI capability research and development platform can provide data and tool support for various links of AI research and development; in the AI capability research and development platform, data can be seamlessly converted into a machine learning model that can provide a predictive service; and automation support can be provided for iterative closed loop of service effects. In an example, AI services may include services such as picture violence-terrorism/pornography recognition, character recognition, large-scale classification, picture clustering and deduplication.

As shown in FIG. 1, FIG. 1 is a schematic diagram of functional structures of an AI capability research and development platform according to an embodiment of the present disclosure. The AI capability research and development platform of the embodiment of the present disclosure can include:

a data management module 110, configured to perform data processing on received data, the data processing includes at least one of the following: analyzing the data type of the data, converting the data according to a preset data format and storing the data; a tool management module 120, configured to store at least one tool, each tool being used to execute a preset processing flow; a process management module 130, configured to perform model training according to the tool provided by the tool management module and the data provided by the data management module; a model management module 140, configured to store a model obtained by the model training.

In the embodiment of the present disclosure, the data management module 110 can also be referred to as a data warehouse module. Different from the data warehouse in general sense, which is only used to provide data storage, the data management module 110 in the embodiment of the present disclosure can support convenient management of data in various formats by a user.

Specifically, the data management module 110 can set an entry for receiving data, and the user can upload data through the entry. After receiving the data, the data management module 110 can automatically analyze the data type of the data and convert the data of the expected data type into the preset data format, so that the user can obtain data in a unified format through the data management module 110, which avoids the phenomena such as low efficiency of data processing caused by inconsistent data formats.

It can be understood that the data management module 110 can also analyze the data type of the data according to a user trigger. In an example, the data management module 110 can set an analyzing control; when the user clicks the analyzing control, the data management module 110 analyzes the data type of the data in response to a click operation, and further converts the data of the expected data type into the preset data format.

In practical applications, if the data management module 110 analyzes the data and finds that the data type of the data does not meet the expectation, the data management module 110 can modify a configuration item of the data according to a modification operation of the user to make the modified data type meet the expectation, and further convert the data of the expected data type into the preset data format, which is not specifically limited in the embodiment of the present disclosure.

In specific applications, when performing model training, it may be necessary to perform model training using annotated sample data, then the user can obtain, from the data management module 110, source data that needs to be annotated, and upload the source data to the data management module 110 after annotating the source data. The data management module 110 can store the annotated data in a unified manner for subsequent model training.

In practical applications, the function of the data management module can also be set according to a practical application scenario. In an example, the data management module 110 can be set to support convenient image data import and export as well as standardization capability, such as supporting the hyper text transport protocol (HTTP), hadoop distributed file system (HDFS) and other types of data sources, as well as data standardization for compressed package format (zip), javascript object notation (JSON), serialization data structure protocol "protobuf", comma-separated values (CSV) and other file formats. Specifically, the standardization is to analyze the data, extract the structures of data samples, and store them in a standardized way for subsequent use.

In an example, the data management module 110 can also be set to support flexible and convenient data preview, query, and statistics capabilities. Specifically, in order to support data of any scale, a distributed file system can be adopted at the bottom of the platform, which can meet needs of a large amount of batch data reading and writing and batch data processing. In order to meet the needs of a small amount of data sequence preview and fast query, key-value (KV) storage can be adopted in the data management module to facilitate data indexing.

In an example, the data management module 110 can also be set to support functions such as data cleaning and data annotation docking, which is not specifically limited in the embodiment of the present disclosure.

Figure 2:
FIG. 2 is a schematic diagram of a data list interface of a data management module according to an embodiment of the present disclosure.

In an example, FIG. 2 is a schematic diagram of a data list interface of the data management module 110 according to an embodiment of the present disclosure. In the data management module 110, standardized data, non-standardized data, annotated data and the like can be stored. In the data list interface of the data management module 110, the name, creation time, file type, status, sharing status and the like of each data set can also be displayed, which is not specifically limited in the embodiment of the present disclosure.

Figure 3:
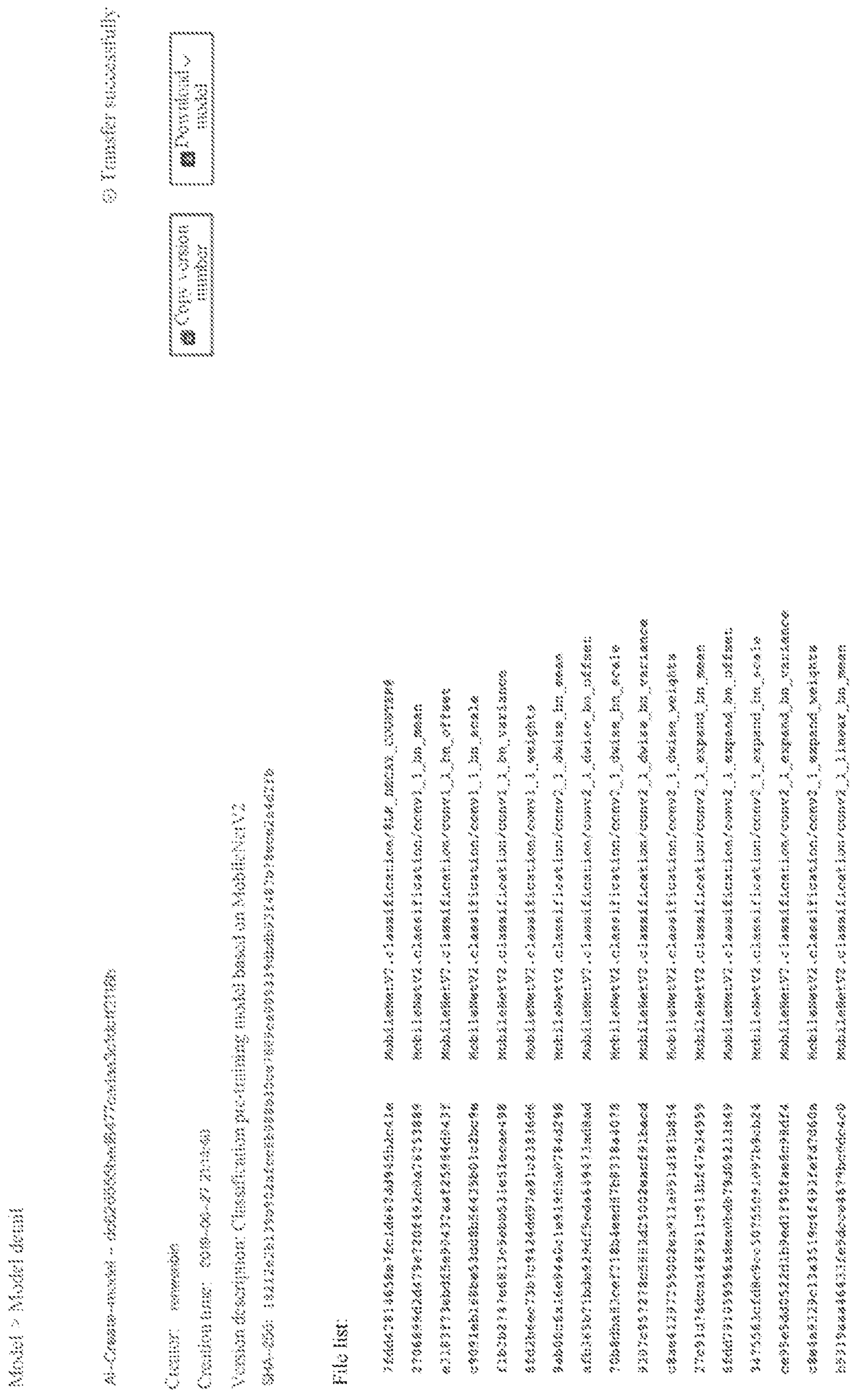
FIG. 3 is a schematic diagram of a data detail interface of a data management module according to an embodiment of the present disclosure.

In an example, FIG. 3 is a schematic diagram of a data detail interface of the data management module 110 according to an embodiment of the present disclosure. In the data management module 110, operations such as data combination, data connection, data splitting, data conversion, and data export can be performed on the data sets. In the data details of the data management module 110, controls corresponding to the operations can also be displayed, including for example a data combination control, a data connection control, a data splitting control, a data conversion control, and a data export control, etc., which is not specifically limited in the embodiment of the present disclosure.

In the embodiment of the present disclosure, the tool management module 120 can also become a tool warehouse. One or more tools can be stored in the tool management module 120. Specifically, a tool can be code for completing a certain function, and the code may specifically be a combination of multiple script files or binary files. After the tool is encapsulated and integrated into the AI capability research and development platform, the tool can be conveniently called and used. In specific applications, a preset processing flow in the code can be executed when the tool is run.

It can be understood that in practical applications, the tool management module 120 can also support operations such as tool upgrade and modification, which is not specifically limited in the embodiment of the present disclosure.

In specific applications, the tools in the tool management module 120 can include not only tools that are fixedly set by the platform, but also tools that are customized according to practical application scenarios, that is, different types of tools can be set according to different needs. In an example, from the types of capabilities, the tools can be divided into following types: a data cleaning type, a data mining type, a model training type, a service evaluation type, a data backflow type, a batch prediction type, etc.; from the manners of running, the tools can be divided into: a distributed-system foundation architecture “hadoop” tool, a universal parallel framework “spark” tool, an open source deep learning platform “paddle” cluster training tool, etc. The specific content and form of the tool are not limited in the embodiment of the present disclosure.

In practical applications, the user can define a metafile, declare an input and output (such as input data, an output model), running resource needs, an execution entry and configurable parameters of a tool in the metafile. The source file and other code files are packaged and then submitted to the platform for release, and then the tool can execute the corresponding process according to the configuration parameters. Optionally, the configurable parameters of the tool can be presented to the user in a workflow page in a visual interface, so that the use of the tool is visualized to the user.

Usually a tool requires certain resources for its execution. In an example, an image clustering tool requires “hadoop” resources, the model training requires graphics processing unit (GPU) cluster resources, and the batch prediction requires central processing unit (CPU) cluster resources. Through declaring the resource needs in the metafile by the user, the tool can be directly used without coordinating various resources.

In specific applications, the tool management module 120 can also be set according to actual needs to support platform-level tools and project-level tools. The specific platform-level tools are provided by the platform side and can be used by all users. The project-level tools can be shared within a project, between projects and across the platform according to different sharing methods of users, and other users who can see the tools can reuse them, thereby improving the efficiency of tool reuse. The embodiment of the present disclosure does not specifically limit this.

In an example, FIG. 4 is a schematic diagram of an interface of the tool management module 120 according to an embodiment of the present disclosure. In the tool management module 120, system tools, custom tools and the like can be stored. In the user interface of the tool management module 120, the name, creation time, creator, status and the like of each tool can also be displayed, which is not limited in the embodiment of the present disclosure.

In the embodiment of the present disclosure, the process management module 130 can also be referred to as a process platform. The process management module can be built based on the modules provided by the AI capability research and development platform such as the data management module 110, the tool management module 120 and the model management module 140. By constructing a directed acyclic graph (DAG) process, the data, model, tools and service are combined to form a calculation graph, and the capability of realizing AI service output from data is finally achieved by executing this calculation graph.

In specific applications, the process management module 130 can be used as a calling system of the AI capability research and development platform, and is the core of link automation of the AI capability research and development platform. In an example, the process management module 130 can prepare data (such as data required for training models) or models (such as batch prediction) for each tool node in the calculation graph, and then allocate a calculation resource (such as a “hadoop” calculation resource) to it. And after the tool is executed, its output is registered to a corresponding output resource (such as a training tool output model).

In practical applications, the process management module 130 can provide a sketchpad page. The user can complete the construction of a workflow by manners such as dragging data and tools in the sketchpad page, and then execute the workflow to obtain the required output, such as inputting data in the workflow and outputting an updated service after running.

It can be understood that in practical applications, the process management module 130 can also be set to support a reusable workflow. In an example, a logo recognition service process is a relatively complicated workflow; after this recognition service process is constructed in the process management module 130, if the new business party needs to perform additional picture recognition, etc., only the input and part of the configuration of the workflow needs to be adjusted, then the required model and service can be produced, which provides the possibility of rapid migration for applying to new similar problems. The embodiment of the present disclosure does not specifically limit this.

Figure 5:
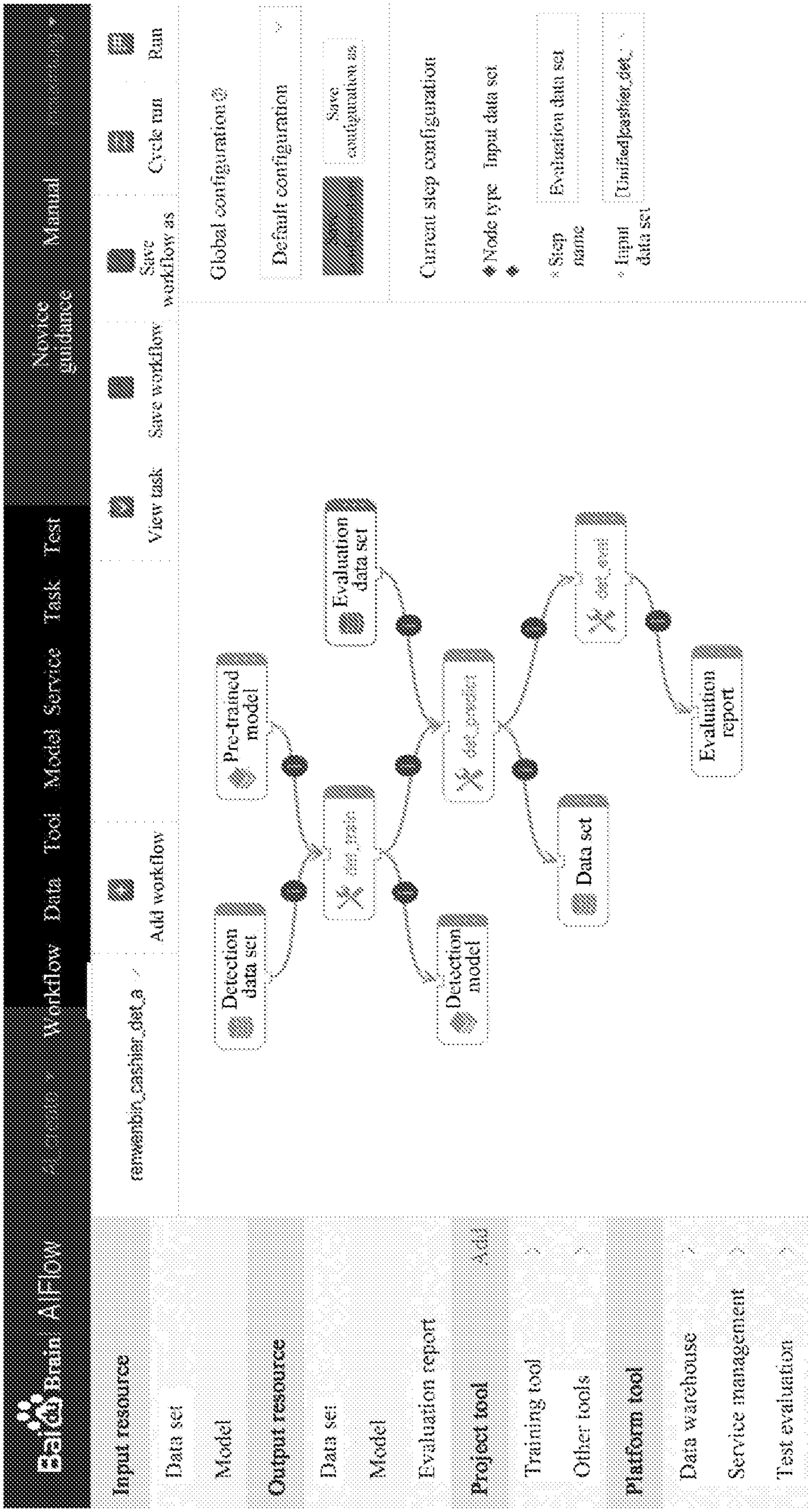
FIG. 5 is a schematic diagram of a sketchpad interface of a process management module according to an embodiment of the present disclosure.

In an example, FIG. 5 is a schematic diagram of a sketchpad interface of the process management module 130 according to an embodiment of the present disclosure. Any end-to-end AI research and development visualization process can be completed by dragging various tools on the sketchpad. The left side of the sketchpad is a resource box (input and output placeholders; tool box), the middle is the drag area, and the right side is a corresponding tool or resource configuration area. The user can drag the input, multiple tools, output boxes in order and complete the connecting lines based on upstream and downstream dependency relationship to generate any end-to-end research and development process.

The connecting line between tools indicates a process dependency, which determines the execution order between tools, and requires a downstream tool to start execution after all upstream tools have been executed. The connecting line from a tool groove to a next tool groove means that the latter depends on the former in the process. Parameter dependency not only meets the tool execution order required in the process dependency, but also specifies the correspondence between upstream and downstream parameters. The upstream output parameters are directly passed to the downstream input parameters, and the AI platform automatically completes the application and transfer of intermediate resources. When clicking a status button above the connecting line, the corresponding relationship between the upstream and downstream parameters can be seen, and can be adjusted according to needs.

After constructing or updating the workflow, a save workflow button is needed to click to save the workflow "Graph", various tools and resource configuration items. The tools and resource configuration items are called global configuration of the workflow. The global configuration of the workflow refers to the collection of the configuration of the steps of the workflow saved by the user, and can be loaded through the drop-down selection. The running of the workflow supports periodic scheduling, which facilitates routine running of processes. After filling in the workflow configuration, click a run button to start scheduling, fill in the periodic scheduling information, and click OK.

In the embodiment of the present disclosure, the model management module 140 can also become a model warehouse, and the model management module 140 can store models produced by various training tasks. Specifically, a model can include model weight itself and key information in the model production process, such as, the creator, training data set information, model index, and so on, so as to help the user understand the model more comprehensively.

Figure 6:
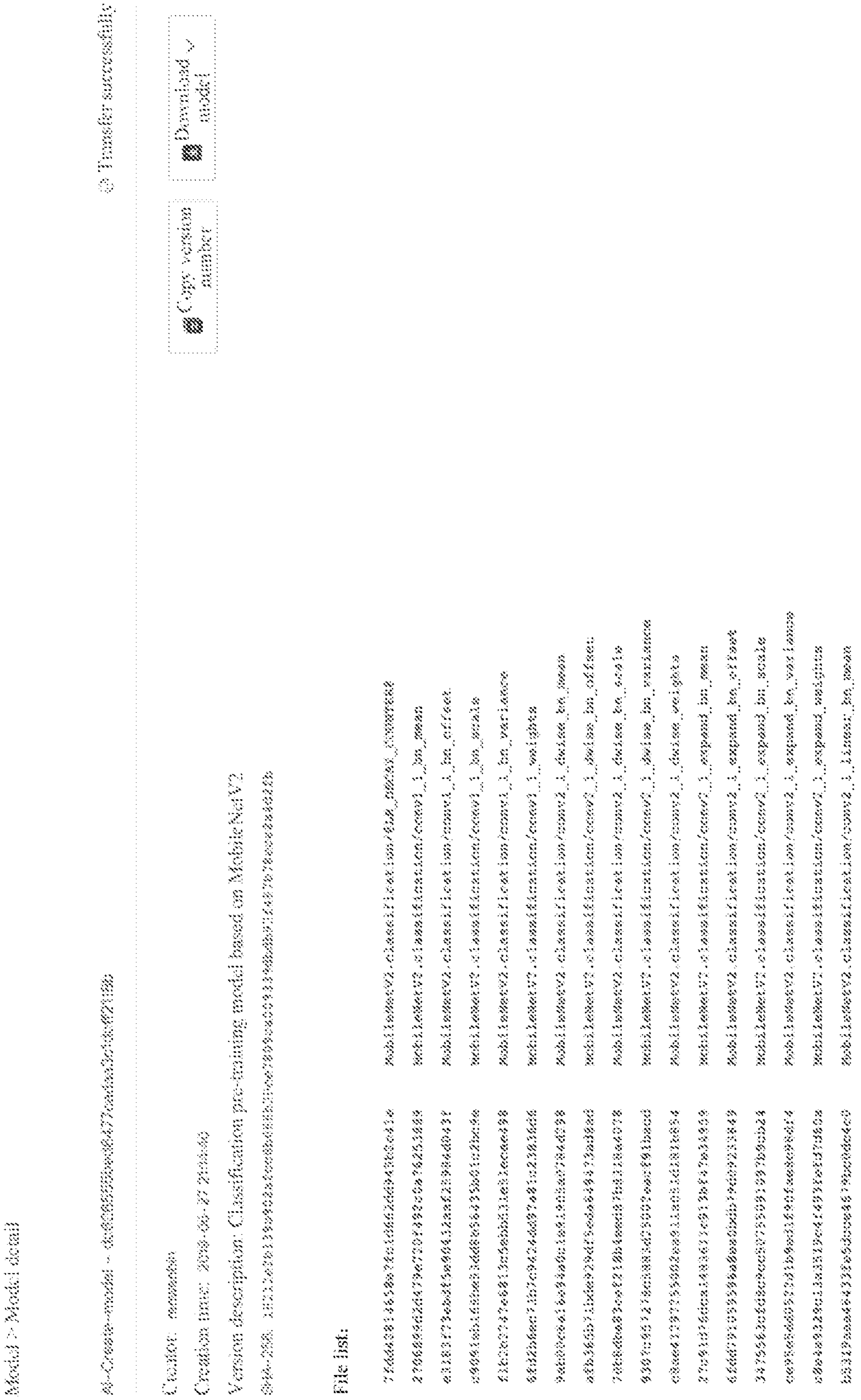
FIG. 6 is a schematic diagram of an interface of a model management module according to an embodiment of the present disclosure.

In an example, FIG. 6 is a schematic diagram of an interface of the model management module 140 according to an embodiment of the present disclosure. In the interface of the model management module 140, the name, creation time, creator, status and the like of each model can also be displayed, which is not specifically limited in the embodiment of the present disclosure.

It can be understood that in practical applications, the models in the model management module 140 can also be set to be used for service launch, batch prediction, model fine-tuning, etc., which is not specifically limited in the embodiment of the present disclosure.

Embodiments of the present disclosure provide an AI capability research and development platform and a method, where the AI capability research and development platform can support the online process from data collection to model acquisition, and can efficiently perform model development. Specifically, the AI capability research and development platform of an embodiment of the present disclosure includes: a data management module, a tool management module, a process management module and a model management module, where the data management module is configured to perform data processing on received data, where the data processing includes at least one of the following: analyzing the data type of the data, converting the data according to a preset data format and storing the data; the tool management module is configured to store at least one tool, each tool being used to execute a preset processing flow; the process management module is configured to perform model training according to the tool provided by the tool management module and the data provided by the data management module; the model management module is configured to store the model obtained by the model training. During model training in the embodiment of the present disclosure, data collection, model training and the like can be uniformly processed on the platform without communication and debugging by offline personnel from multiple parties, and the development efficiency is relatively high.

Figure 7:
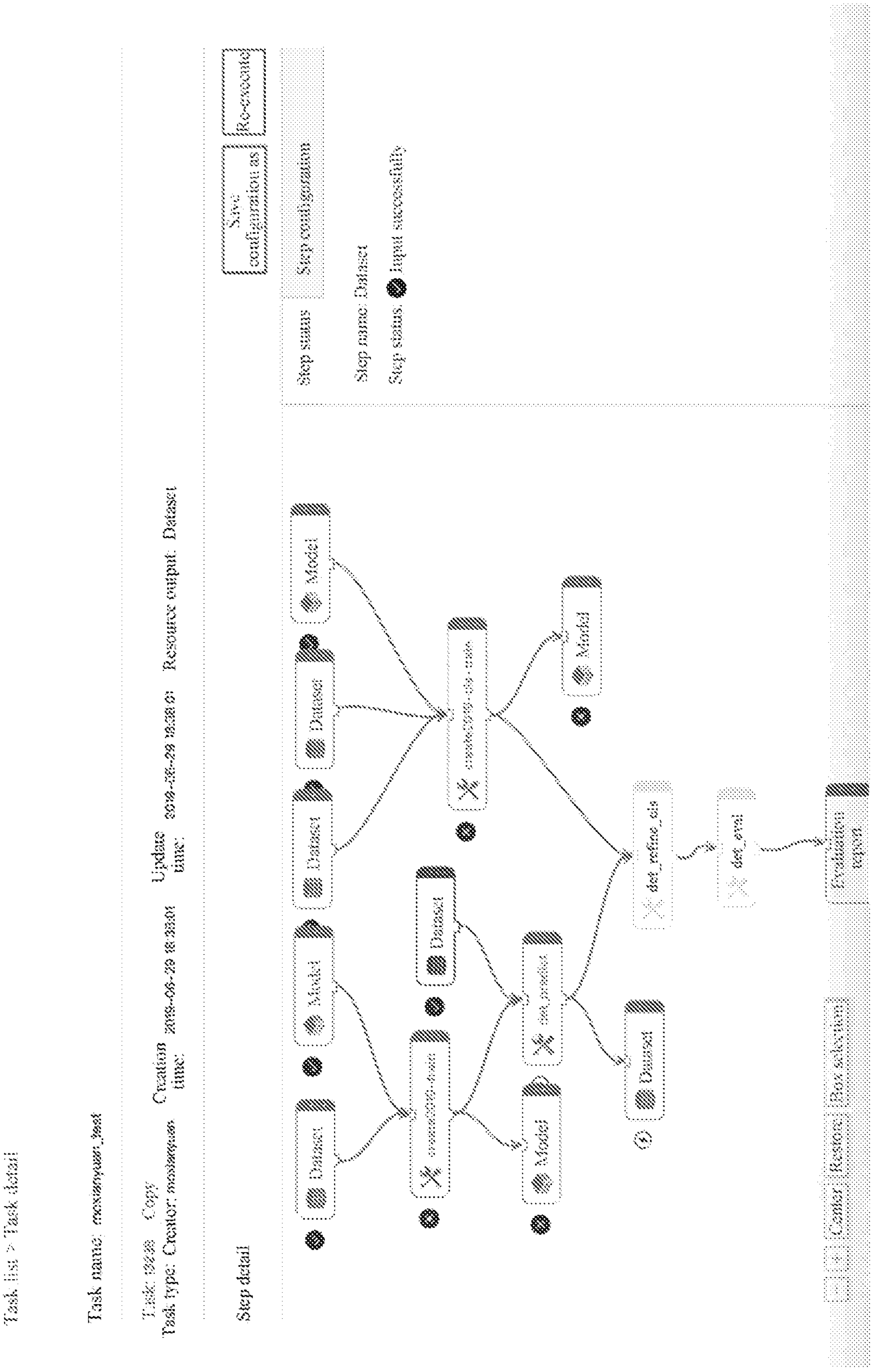
FIG. 7 is a schematic diagram of an interface of a task module according to an embodiment of the present disclosure.

Optionally, a task module can further be included in the embodiment of the present disclosure, as shown in FIG. 7. FIG. 7 is a schematic diagram of an interface of the task module according to an embodiment of the present disclosure. The task module can be in the form of "Graph" to visually display the real-time status of each step during the workflow running, and the user can click each step to view task details. Optionally, in the AI capability research and development platform according to the embodiment of the present disclosure, the data management module 110 is further configured to: collect to-be-back-flow data, where the to-be-back-flow data is data that meets a preset condition; the to-be-back-flow data is used to provide source data for model iteration.

In the embodiment of the present disclosure, the data management module 110 can also automatically realize data back-flow. The collected to-be-back-flow data is automatically recharged to the data set of the data management module 110 to realize automatically update of the data set, and in the subsequent model training, the automatic iteration can be performed according to the updated data, so that the task of data collection can be realized automatically, which improves the efficiency of model training.

In specific applications, the to-be-back-flow data may be the case that: when the user performs an operation such as opening a webpage in the data platform, if there is a picture on the webpage that the platform currently cannot recognize during the operation of opening the webpage, the picture can be collected as the to-be-back-flow data. The to-be-back-flow data may also be the case that: the to-be-back-flow data that needs to be flowed back is filtered out in the platform page according to a filtering condition preset by the platform. It can be understood that the specific content of the to-be-back-flow data can be determined according to a practical application scenario, which is not specifically limited in the embodiment of the present disclosure.

It can be understood that in practical applications, the collection period of the to-be-back-flow data can be set according to a practical load situation, and the to-be-back-flow data is collected at intervals of the collection period to balance the load and improve the running efficiency of the AI capability research and development platform. In an example, the collection period may be any value from thirty seconds to five minutes, which is not specifically limited in the embodiment of the present disclosure.

In an implementable manner of the embodiment of the present disclosure, the collecting of the to-be-back-flow data includes:

setting the to-be-back-flow data in a back-flow catalog; collating the back-flow catalog according to a preset frequency; where the collating includes: sorting to-be-back-flow data which is collected during a preset time period, and setting a same kind of to-be-back-flow data in the to-be-back-flow data which is collected during the preset time period into one back-flow catalog.

Figure 8:
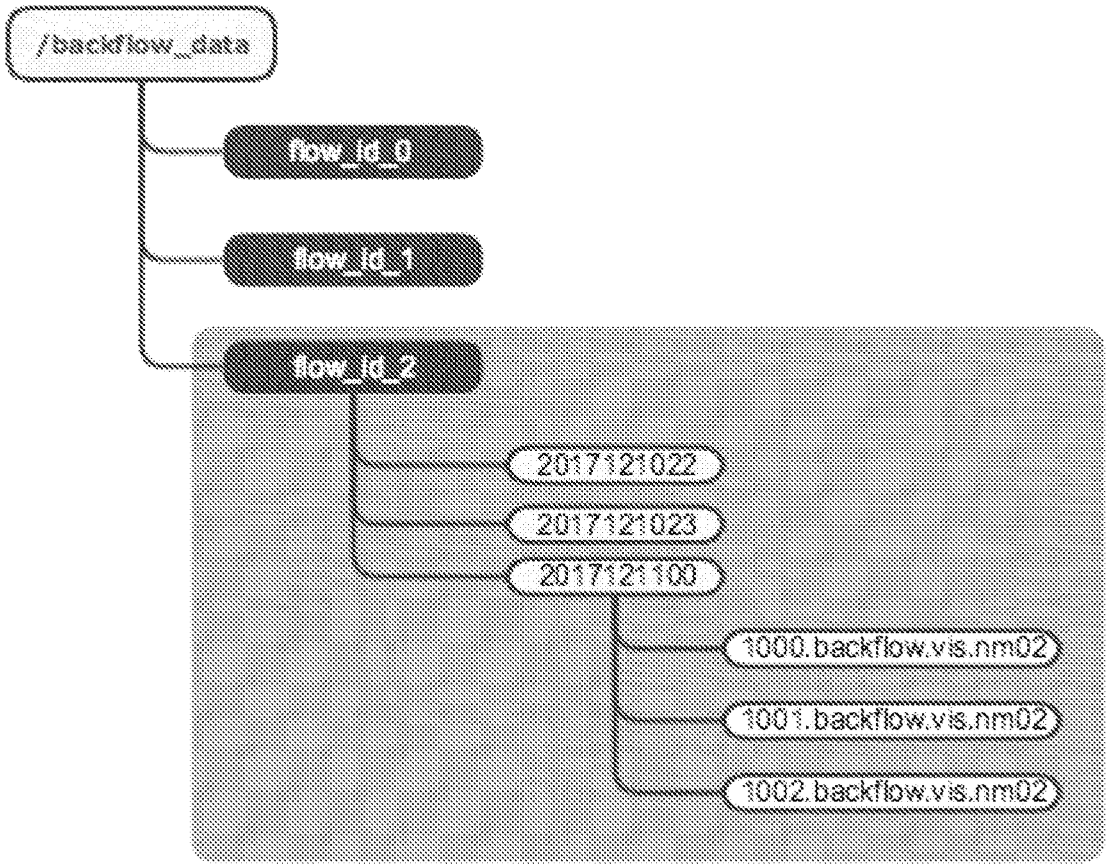
FIG. 8 is a schematic diagram of a back-flow catalog of an AI capability research and development platform according to an embodiment of the present disclosure.

In an example, as shown in FIG. 8, FIG. 8 shows a schematic diagram of a back-flow catalog. The AI capability research and development platform can define a storage file "backflow-data" of the to-be-back-flow data, and collect the to-be-back-flow data regularly. The to-be-back-flow data is set in different back-flow catalogs upon defining different names. In an example, the data can be divided according to the area, where the to-be-back-flow data collected in area A is stored in "flow-id-0" as shown in FIG. 8, the to-be-back-flow data collected in area B is stored in "flow-id-1" as shown in FIG. 8, and the to-be-back-flow data collected in area C is stored in "flow-id-2" as shown in FIG. 8. It can be understood that a back-flow catalog can include multiple levels of sub-catalogs. As shown in FIG. 8, the sub-catalogs can be further set according to the date and the like, and the to-be-back-flow data is correspondingly stored in the sub-catalogs.

In specific applications, since the back-flow data of one data stream is usually divided in many small files, which may generate more space debris, the back-flow data can be regularly collated. In an example, the date before 30 days can be collated every day, and the data belonging to the same "flow_id" can be collated into one file, which is not specifically limited in the embodiment of the present disclosure.

Optionally, the tool management module 120 is further configured to: receive, in a tool creation page of the tool management module, a tool creation operation of the user; and generate a tool according to the tool creation operation.

In the embodiment of the present disclosure, the tool management module 120 can provide the tool creation page. The user can perform a tool creation operation such as inputting code, configuring parameters in the tool creation page according to actual needs, and a custom tool can be generated based on the tool creation operation, thereby meeting the diverse needs of the user for tools.

Optionally, the data management platform further includes: a test module, configured to test the trained model; a platform management module, configured to coordinate and manage the data management module, the tool management module, the process management module, the model management module and the test module at a project granularity.

In the embodiment of the present disclosure, the test module can include a test tool. In specific applications, when the test module tests a model, the model can be connected to the test tool in the sketchpad to obtain a test result. Optionally, the test module can also generate a test report, which is convenient for the user to view the test result.

In the embodiment of the present disclosure, considering that the project granularity is usually used in actual modeling, the platform management module can coordinate and manage the data management module, the tool management module, the process management module, the model management module and the test module at the project granularity, thereby improving the efficiency of project modeling. It can be understood that the platform management module can also be used for user authentication, user guidance, etc., to assist the user in using the platform, which is not specifically limited in the embodiment of the present disclosure.

In summary, in the AI capability research and development platform of the embodiment of the present disclosure, the data management module has convenient capabilities of picture data import, export, preview, viewing, conversion and statistics, and can be seamlessly docked with services such as model training, public test annotating, and data back flow; the model management module can provide unified model storage, management, encryption and automated evaluation of testing and launching capabilities; the platform management module can provide unified visual-type-service management, virtualization technology, convenient authentication, statistics, and data back flow support; the tool management module has easy-to-use functions of tool making, management and use; the process management module can support convenient process construction and automated running capabilities, so that the AI capability research and development platform of the embodiment of the present disclosure can support whole-process automated upgrade and iteration from data to model to service and then to data. When the AI capability research and development platform is applied to AI research and development, all links of AI research and development are completed on the platform, and offline communication and confirmation are almost no longer needed, which can greatly improve efficiency of the AI research and development.

In order to illustrate the AI capability research and development platform of the embodiment of the present disclosure more clearly, the specific application process from data collection to model training is described below with the project granularity. It can be understood that the project can be a project established in research and development, and the specific content of the project can be determined according to a practical application scenario, which is not specifically limited in the embodiment of the present disclosure.

The data management module 110 is specifically configured to:

receive to-be-processed data of a project; analyze a data type of the to-be-processed data; convert to-be-processed data whose data type meets a preset condition in the to-be-processed data into target data; where the target data has the preset data format; perform statistic on the target data; sort the target data into a test set and a data set.

In the embodiment of the present disclosure, the to-be-processed data may be local data of the user, and the data management module can receive local data uploaded by the user; the to-be-processed data may also be data on a web page, and the data management module can receive data sent from the web page, which is not specifically limited in the embodiment of the present disclosure.

In the embodiment of the present disclosure, an analyzing control can be set in the data management module 110, and after receiving the trigger of the analyzing control by the user, the data management module 110 can analyze the data type of the to-be-processed data. In an example, when analyzing the data type of the to-be-processed data, the data management module 110 can infer the type of the to-be-processed data and the data set "schema" ("schema" is a language for describing and standardizing the logical structure of a file, and the biggest role thereof is to verify the correctness of the logical structure of the file.) etc. If the data type of the to-be-processed data meets a preset condition, the to-be-processed data can be converted to the target data; optionally, if there is data whose data type does not meet the preset condition in the to-be-processed data, the to-be-processed data whose data type does not meet the preset condition in the to-be-processed data can be modified into data of the preset data format according to a modification operation of the user, and the modified data is converted to the target data. It can be understood that the preset condition can be determined according to a practical application scenario, which is not specifically limited in the embodiment of the present disclosure.

In practical applications, after analyzing the data type of the to-be-processed data, the to-be-processed data can be identified by the file name and content. In an example, taking the to-be-processed data being a picture as an example, the to-be-processed data produced after analyzing can include: a filename which can represent a path of the picture data in a TAR (a compression and packaging tool on Unix and Unix-like systems, which can combine multiple files into one file, with the suffix of the packed file being also TAR) package; content which can be picture data. A label name can further be extracted from the filename. In order to facilitate the subsequent training docking, a class identity (ID) can be assigned to each label, and the picture and the ID of the label field are renamed.

In an example, in an implementable manner, the method for converting the to-be-processed data into the target data can be: popping up a code input box according to a conversion trigger from the user, and converting the to-be-processed data into the target data according to code entered by the user in the code input box. In the conversion, a "schema" editing area can also be provided, and in the "schema" editing area, the user can modify the ID of a content field to "image", and add label and class_name fields. In specific applications, a trial running function can also be set up; the user can click a trial run button to execute the code conversion with a small amount of data, preview the conversion result, and after confirming that the result is correct, click a convert button to initiate a data conversion task.

In specific applications, the converted target data may have multiple classes, so the statistic on the target data can be performed. In an optional implementation, the performing statistic on the target data includes: querying data of at least one preset class in the target data; and performing, in each preset class, statistic on data of the each preset class.

Figure 9:
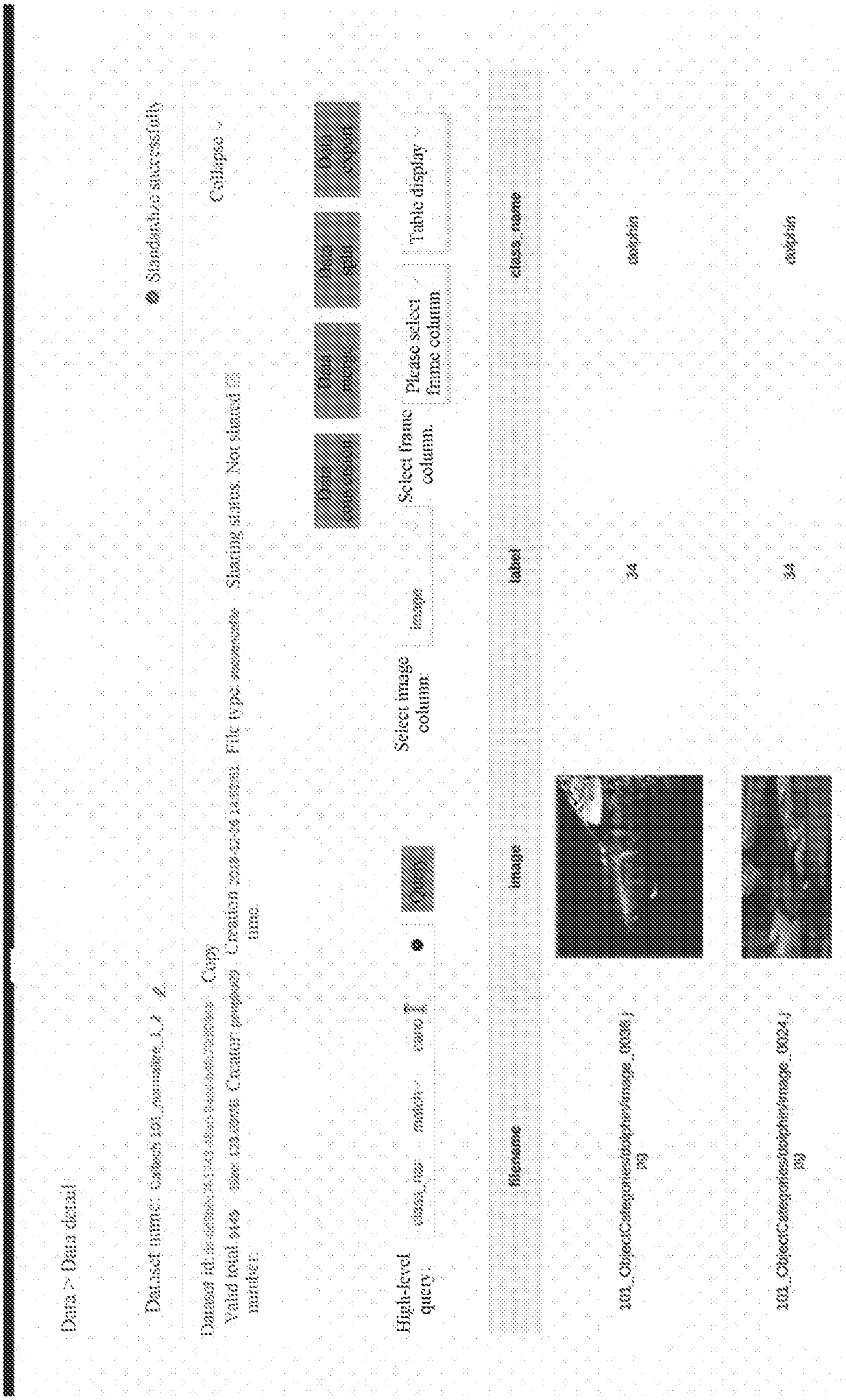
FIG. 9 is schematic diagram of a target data display interface in an AI capability research and development platform according to an embodiment of the present disclosure.

In an example, as shown in FIG. 9, the target data obtained by converting the to-be-processed data can have four columns: filename, image, label, and class_name, where the label and class_name are classification information of a picture. The user can query pictures in the target data according to a class, and can also initiate a statistical task to perform statistic on the distribution of samples. Specifically, the user can query samples according to the class after turning on a data set query function, and the user can obtain the distribution of the samples by initiating the statistical task. In an example, the user can open a statistical-item filtering panel, choose the label and class_name fields to perform statistic in the form of data type "enum", and initiate the statistical task.

Figure 10:
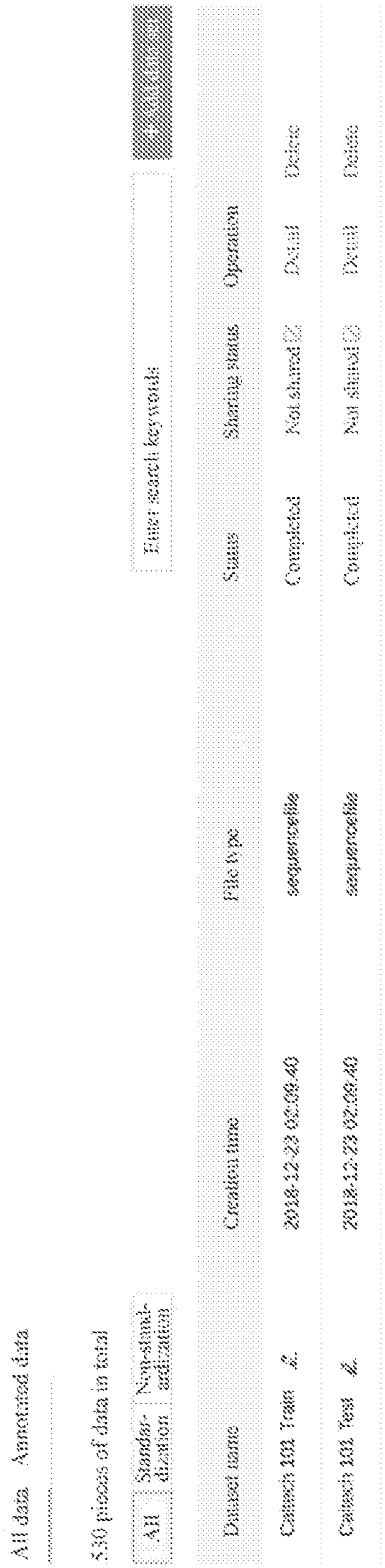
FIG. 10 is a schematic diagram of a split data set interface in an AI capability research and development platform according to an embodiment of the present disclosure.

In specific applications, a data set is needed in model training, and a test set is needed in model testing. Therefore, in the data processing module, the target data can also be divided into the test set and the data set. In an example, taking the target data being "Caltech 101" as an example, before using "Caltech 101" data for training, the "Caltech 101" can be divided into a training set and a test set according to a ratio of 80-20. In an implementation, the AI capability research and development platform can provide a data split button; the user can click the data split button, drag a slider to specify the split ratio, fill in the names of the two data sets produced by the splitting, and finally click the data split button to start a splitting task. In an example, as shown in FIG. 10, after the splitting task is completed, the two data sets "Caltech 101 train" and "Caltech 101 test" produced by the splitting can be in a completed state.

Optionally, the process management module 120 is further configured to:

provide a model training user interface; receive a target data set and a target tool chose by the user in the model training user interface; receive, in the model training user interface, a connecting line between the target data set and the target tool from the user; transfer the target data set to the target tool according to the connecting line; in the case of receiving a running instruction, perform model training according to the target tool to obtain a trained model.

In the embodiment of the present disclosure, the model training user interface can also be referred to as a sketchpad page.

In specific applications, a tool catalog corresponding to the existing tools in the tool management module can be displayed on the sketchpad page. The tool catalog mainly includes meta information and entry scripts, where the meta information records basic information of tools, entry execution commands, front-end dynamic configuration and tool identities, and the entry scripts are main entries of tool service logics. By triggering a tool identity in the tool catalog, the tool can be called.

The existing data identities in the data management module can also be displayed on the sketchpad page. By triggering a data identity, the data can be called.

Figure 11:
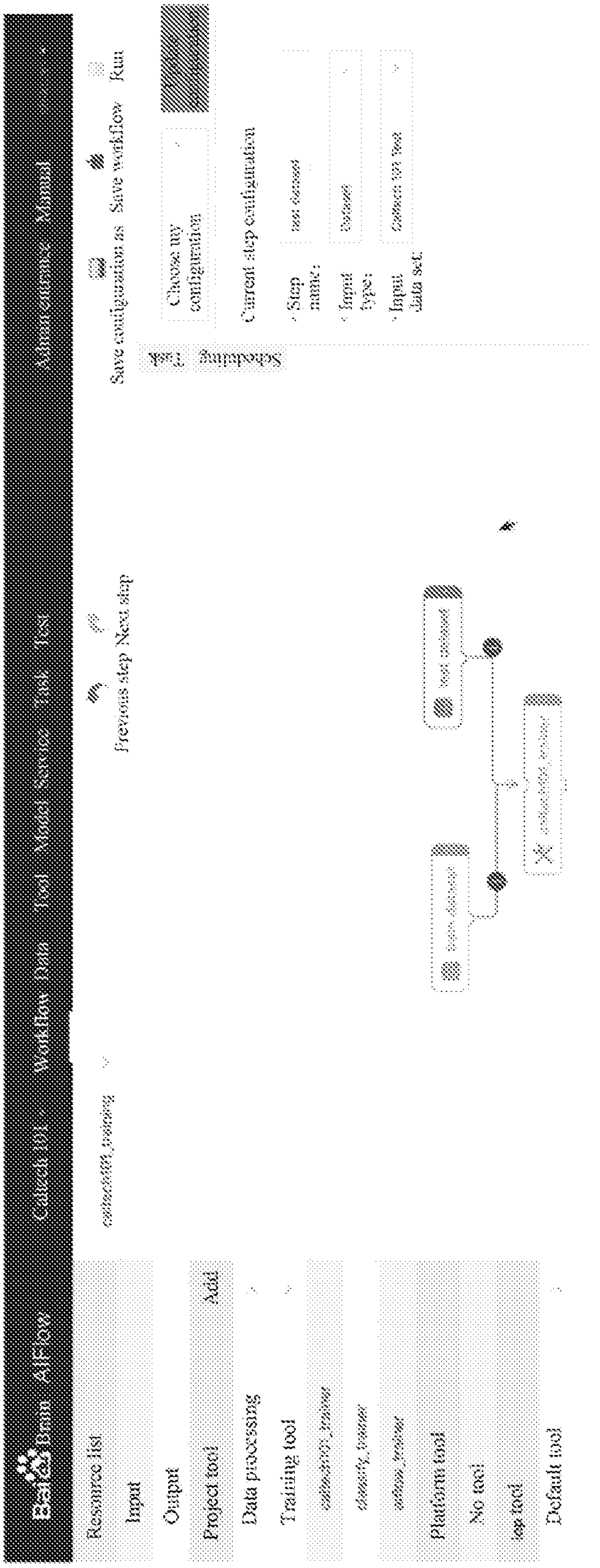
FIG. 11 is a schematic diagram of a sketchpad page interface in an AI capability research and development platform according to an embodiment of the present disclosure.

When performing model training, as shown in FIG. 11, the user can drag data and a tool on the left side of the sketchpad to an editing area of the sketchpad, and connect the data with the tool to create an executable workflow. Taking a sorting training workflow as an example, an input resource can be two data sets: a training data set "train-dataset" and a test data set "test-dataset", an output resource is a model, and "caltech101_trainer" can be used as the tool. After a training task is initiated, the input resource (data) can be automatically transferred to the tool, and a model file produced by the training can be released to the model warehouse.

In specific applications, when executing the workflow, various resources and tool items can also be chose in the sketchpad page by drop-down selection, the corresponding parameter configuration is filled in, and the connecting line status is confirmed as correct. It can be understood that if there is an error, operations such as modifying can be performed.

Figure 12:
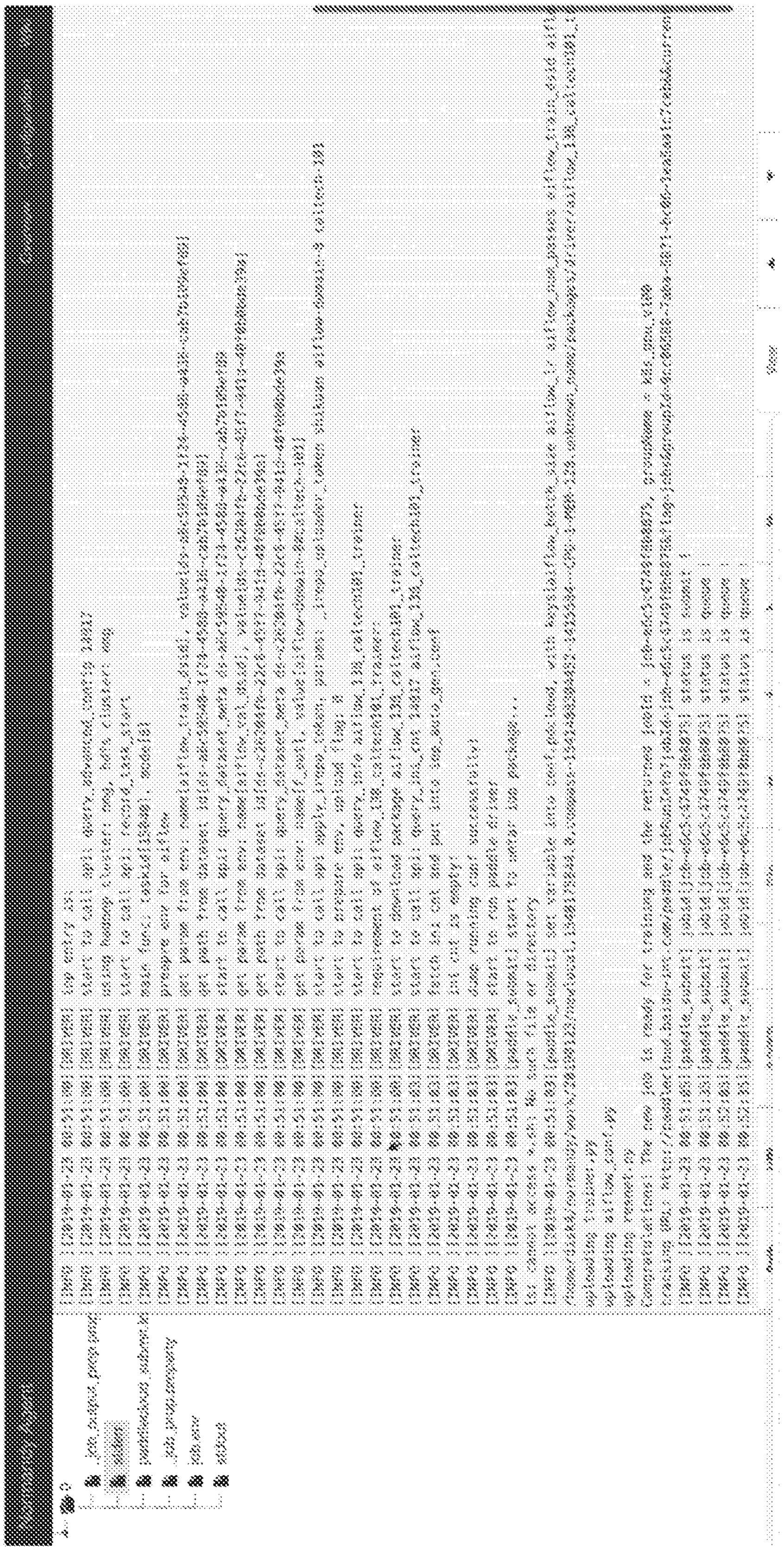
FIG. 12 is a schematic diagram of a log interface in an AI capability research and development platform according to an embodiment of the present disclosure.

In specific applications, after completing the above steps, a sorting training workflow task is completed. The user can also view the status of each step and log information on a task list page. Specifically, the user can jump from the sketchpad page to the task list page, and view the details of the steps after finding the task that was initiated. In an example, a schematic diagram of a log is shown in FIG. 12, where a "compass log" is a platform execution log link, and a "job log" is generally a cluster task log link.

Optionally, the process management module is further configured to: display a model corresponding to a model viewing instruction in the case of receiving the model viewing instruction.

In the embodiment of the present disclosure, for a trained model, the user can also view and reuse the model, therefore, in the case of receiving the model viewing instruction, the process management module can display the model corresponding to the model viewing instruction, which is convenient for the user's subsequent processing of the model.

In summary, the embodiments of the present disclosure provide an AI capability research and development platform and a method, where the AI capability research and development platform can support the online process from data collection to model acquisition, and can efficiently perform model development. Specifically, the AI capability research and development platform of an embodiment of the present disclosure includes: a data management module, a tool management module, a process management module and a model management module, where the data management module is configured to perform data processing on the received data, where the data processing includes at least one of the following: analyzing the data type of the data, converting the data according to a preset data format and storing the data; the tool management module is configured to store at least one tool, each tool being used to execute a preset processing flow; the process management module is configured to perform model training according to the tool provided by the tool management module and the data provided by the data management module; the model management module is configured to store the model obtained by the model training. During model training in the embodiment of the present disclosure, data collection, model training and the like can be uniformly processed on the platform without communication and debugging by offline personnel from multiple parties, and the development efficiency is relatively high.

Figure 13:
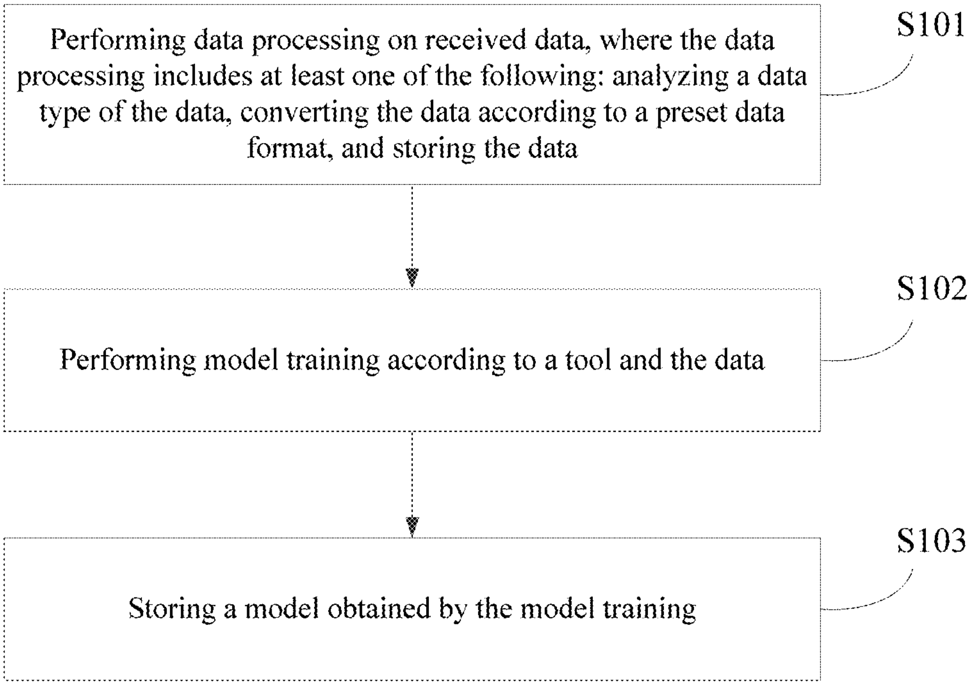
FIG. 13 is a schematic flowchart of data processing according to an embodiment of the present disclosure.

As shown in FIG. 13, FIG. 13 is a schematic flowchart of a data processing method according to an embodiment of the present disclosure. Applied to an AI capability research and development platform, the method can specifically include:

Step S101: performing data processing on received data, where the data processing includes at least one of the following: analyzing a data type of the data, converting the data according to a preset data format, and storing the data.

Step S102: performing model training according to a tool and the data.

Step S103: storing a model obtained by the model training.

Optionally, the method also includes:

collecting to-be-back-flow data, where the to-be-back-flow data is data that meets a preset back-flow condition; the to-be-back-flow data is used to provide source data for model iteration.

Optionally, the collecting to-be-back-flow data includes:

setting the to-be-back-flow data in a back-flow catalog;

collating the back-flow catalog according to a preset frequency; where the collating includes: sorting to-be-back-flow data which is collected during a preset time period, and setting a same kind of to-be-back-flow data in the to-be-back-flow data which is collected during the preset time period into one back-flow catalog.

Optionally, the method also includes:

receiving, in a tool creation page, a tool creation operation of a user;

generating a tool according to the tool creation operation.

Optionally, the method also includes:

testing the model obtained by the training.

Optionally, after testing the model obtained by the training, the method further includes:

generating a test report.

Optionally, a type of the tool includes at least one of the following: a data cleaning type, a data mining type, a model training type, a service evaluation type, a data back-flow type, and a batch prediction type.

Optionally, the performing data processing on the received data includes:

receiving to-be-processed data of a project;

analyzing a data type of the to-be-processed data;

converting to-be-processed data whose data type meets a preset condition in the to-be-processed data into target data; where the target data has a preset data format;

performing statistic on the target data;

sorting the target data into a test set and a data set.

Optionally, the method also includes:

modifying, according to a modification operation of the user, to-be-processed data whose data type does not meet the preset condition in the to-be-processed data into data of the preset data format.

Optionally, the performing statistic on the target data includes:

querying data of at least one preset class in the target data;

performing, in each preset class, statistic on the data of the each preset class.

Optionally, the method also includes:

providing a model training user interface;

receiving, in the model training user interface, a target data set and a target tool selected by the user;

receiving, in the model training user interface, a connecting line between the target data set and the target tool from the user;

transferring the target data set to the target tool according to the connecting line;

performing model training according to the target tool to obtain a trained model in the case of receiving a running instruction.

Optionally, the method also includes:

displaying a model corresponding to a model viewing instruction in the case of receiving the model viewing instruction.

In summary, the embodiments of the present disclosure provide an AI capability research and development platform and a method, where the AI capability research and development platform can support the online process from data collection to model acquisition, and can efficiently perform model development. Specifically, the AI capability research and development platform of an embodiment of the present disclosure includes: a data management module, a tool management module, a process management module and a model management module, where the data management module is configured to perform data processing on the received data, where the data processing includes at least one of the following: analyzing the data type of the data, converting the data according to a preset data format and storing the data; the tool management module is configured to store at least one tool, each tool being used to execute a preset processing flow; the process management module is configured to perform model training according to the tool provided by the tool management module and the data provided by the data management module; the model management module is configured to store the model obtained by the model training. During model training in the embodiment of the present disclosure, data collection, model training and the like can be uniformly processed on the platform without communication and debugging by offline personnel from multiple parties, and the development efficiency is relatively high.

The data processing method provided by the embodiments of the present disclosure can be applied to the methods executed by the modules shown in the corresponding embodiments described above. The implementation and the principle are the same, and will not be repeated again.

An embodiment of the present disclosure further provides an electronic device, including: a processor, a memory and a computer program; where the computer program is stored in the memory and configured to be executed by the processor, and the computer program includes instructions for performing the method according to any one of the foregoing embodiments.

An embodiment of the present disclosure further provides a computer-readable storage medium, having a computer program stored thereon, which, when being executed, implements the method according to any one of the foregoing embodiments.

It can be understood by those skilled in the art: all or part of the steps of realizing the above method embodiments can be completed by hardware related to program instructions. The foregoing program can be stored in a computer-readable storage medium. When the program is executed, the steps involving the foregoing method embodiments are executed; and the foregoing storage medium includes various media that can store program codes, such as a ROM, a RAM, a magnetic disk, or an optical disc.

Finally, it should be noted that the above embodiments are only used to illustrate the technical solutions of the present disclosure, but not limited them; although the present disclosure has been illustrated in detail with reference to the foregoing embodiments, those skilled in the art should understand that: the technical solutions described in the foregoing embodiments may still be modified, or some or all of the technical features can be equivalently replaced; and these modifications or replacements do not deviate the essence of the corresponding technical solutions from the scope of the technical solutions of the embodiments of the present disclosure.

What is claimed is:

1. An artificial intelligence (AI) capability research and development system, wherein the system comprises:

a processor;

a data management module, configured to execute on the processor and perform data processing on received data, wherein the data processing comprises at least one of the following: analyzing a data type of the data, converting the data according to a preset data format, and storing the data;

a tool management module, configured to execute on the processor and store at least one tool, each of the at least one tool being used to execute a preset processing flow;

a process management module, configured to execute on the processor and perform model training according to the tool provided by the tool management module and the data provided by the data management module; and a model management module, configured to execute on the processor and store a model obtained by the model training;

wherein the data management module is specifically configured to:

receive to-be-processed data of a project;

analyze a data type of the to-be-processed data;

convert to-be-processed data whose data type meets a preset condition in the to-be-processed data into target data; wherein the target data has the preset data format;

perform statistic on the target data; and sort the target data into a test set and a data set;

wherein the process management module is further configured to:

provide a model training user interface;

receive, in the model training user interface, a target data set from the target data and a target tool selected by a user;

receive, in the model training user interface, a connecting line between the target data set and the target tool from the user;

transfer the target data set to the target tool according to the connecting line; and perform model training according to the target tool to obtain a trained model in a case of receiving a running instruction.

2. The system according to claim 1, wherein the data management module is further configured to:

collect to-be-back-flow data, wherein the to-be-back-flow data is data that meets a preset back-flow condition; the to-be-back-flow data is used to provide source data for model iteration.

3. The system according to claim 2, wherein collecting to-be-back-flow data comprises:

setting the to-be-back-flow data in a back-flow catalog; and collating the back-flow catalog according to a preset frequency; wherein the collating comprises:

sorting to-be-back-flow data which is collected during a preset time period, and setting a same kind of to-be-back-flow data in the to-be-back-flow data which is collected during the preset time period into one back-flow catalog.

4. The system according to claim 1, wherein the system further comprises:

a test module, configured to execute on the processor and test the model obtained by the training; and a system management module, configured to execute on the processor and coordinate and manage the data management module, the tool management module, the process management module, the model management module and the test module at a project granularity.

5. The platform system according to claim 1, wherein the module management module is further configured to store at least one of a creator, training data set information and model index information of the model.

6. A data processing method, wherein the method comprises:

performing data processing on received data, wherein the data processing comprises at least one of the following: analyzing a data type of the data, converting the data according to a preset data format, and storing the data;

performing model training according to a tool and the data; and storing a model obtained by the model training;

wherein the performing data processing on received data comprises:

receiving to-be-processed data of a project;

analyzing a data type of the to-be-processed data;

converting to-be-processed data whose data type meets a preset condition in the to-be-processed data into target data; wherein the target data has the preset data format;

performing statistic on the target data; and sorting the target data into a test set and a data set;

wherein the method further comprises:

providing a model training user interface;

receiving, in the model training user interface, a target data set from the target data and a target tool selected by a user;

receiving, in the model training user interface, a connecting line between the target data set and the target tool from the user;

transferring the target data set to the target tool according to the connecting line; and performing model training according to the target tool to obtain a trained model in a case of receiving a running instruction.

7. The method according to claim 6, further comprising:

collecting to-be-back-flow data, wherein the to-be-back-flow data is data that meets a preset back-flow condition; the to-be-back-flow data is used to provide source data for model iteration.

8. The method according to claim 7, wherein the collecting to-be-back-flow data comprises:

setting the to-be-back-flow data in a back-flow catalog; and collating the back-flow catalog according to a preset frequency; wherein the collating comprises:

sorting to-be-back-flow data which is collected during a preset time period, and setting a same kind of to-be-back-flow data in the to-be-back-flow data which is collected during the preset time period into one back-flow catalog.

9. The method according to claim 6, further comprising:

receiving, in a tool creation page, a tool creation operation of a user; and generating a tool according the tool creation operation.

10. The method according to claim 6, further comprising:

testing the model obtained by the training.

11. The method according to claim 10, wherein after testing the model obtained by the training, the method further comprises:

generating a test report.

12. The method according to claim 6, wherein a type of the tool comprises at least one of the following: a data cleaning type, a data mining type, a model training type, a service evaluation type, a data back-flow type, and a batch prediction type.

13. The method according to claim 6, further comprising:

modifying, according to a modification operation of a user, to-be-processed data whose data type does not meet the preset condition in the to-be-processed data into data of the preset data format.

14. The method according to claim 6, wherein the performing statistic on the target data comprises:

querying data of at least one preset class in the target data; and performing, in each of the at least one preset class, statistic on data of the each of the at least one preset class.

15. The method according to claim 6, further comprising:

displaying a model corresponding to a model viewing instruction in a case of receiving the model viewing instruction.

16. An electronic device, comprising:

a processor, a memory, and a computer program; wherein the computer program is stored in the memory and configured to be executed by the processor, and the computer program comprises instructions for executing the method according to claim 6.

17. The electronic device according to claim 16, the computer program comprises instructions for:

collecting to-be-back-flow data, wherein the to-be-back-flow data is data that meets a preset back-flow condition; the to-be-back-flow data is used to provide source data for model iteration.

18. The electronic device according to claim 17, wherein the computer program further comprises instructions for:

setting the to-be-back-flow data in a back-flow catalog; and collating the back-flow catalog according to a preset frequency; wherein the collating comprises:

sorting to-be-back-flow data which is collected during a preset time period, and setting a same kind of to-be-back-flow data in the to-be-back-flow data which is collected during the preset time period into one back-flow catalog.

19. The electronic device according to claim 16, the computer program further comprises instructions for:

receiving, in a tool creation page, a tool creation operation of a user; and generating a tool according to the tool creation operation.

20. A non-transitory computer-readable storage medium, having a computer program stored thereon, which, when being executed, implements the method according to claim 6.

* * * * *